United States Patent [19]
Conway

[11] Patent Number: 5,880,806
[45] Date of Patent: Mar. 9, 1999

[54] EYEWEAR FRAME CONSTRUCTION

[75] Inventor: Simon M. Conway, Lima, N.Y.

[73] Assignee: Bausch & Lomb Incorporated, Rochester, N.Y.

[21] Appl. No.: 951,343

[22] Filed: Oct. 16, 1997

[51] Int. Cl.⁶ .................................................. G02C 1/00
[52] U.S. Cl. ................................. 351/86; 351/41; 351/83
[58] Field of Search ................................. 351/41, 83, 86, 351/90, 91, 92, 103, 106, 124

[56] References Cited

U.S. PATENT DOCUMENTS

| | | | |
|---|---|---|---|
| D. 369,375 | 4/1996 | Jannard et al. | D16/326 |
| 2,099,748 | 11/1937 | Mertens . | |
| 2,482,664 | 9/1949 | Gagnon . | |
| 3,394,980 | 7/1968 | Dym | 351/41 |
| 3,605,116 | 9/1971 | Simpson et al. . | |
| 3,657,802 | 4/1972 | Deimas | 29/472 |
| 4,102,566 | 7/1978 | Shelton | 351/131 |
| 4,129,362 | 12/1978 | Lorenzo | 351/123 |
| 4,187,007 | 2/1980 | Lauffer | 351/108 |
| 4,313,652 | 2/1982 | Berman | 351/106 |
| 5,270,743 | 12/1993 | Hofmair et al. | 351/86 |
| 5,315,328 | 5/1994 | Hofmair et al. | 351/121 |
| 5,587,747 | 12/1996 | Bernheiser | 351/105 |

FOREIGN PATENT DOCUMENTS

W035925  3/1996  WIPO .

*Primary Examiner*—Hung Xuan Dang
*Attorney, Agent, or Firm*—Katherine McGuire

[57] ABSTRACT

An eyewear apparatus and method for attaching various eyewear frame components together to form a single front frame unit where the components are formed from different material such as metals and plastics. Right and left eye members define right and left eye openings wherein a pair of lenses are inserted. A bridge component has a central portion with four arms radially extending from the central portion. Lugs are provided at the end of at least two, but preferably all four arms of the bridge component which align with lugs provided on the eye members which extend toward the respective eye opening thereof. Securing members are passed consecutively through each lens and aligned pair of lugs on the eye members and bridge component. A pair of tabbed projections are also provided on the eye members which extend into opposite ends of a channel extending laterally through the central portion of the bridge component, thereby establishing a total of six attachment points between the bridge, eye members and lenses.

15 Claims, 3 Drawing Sheets

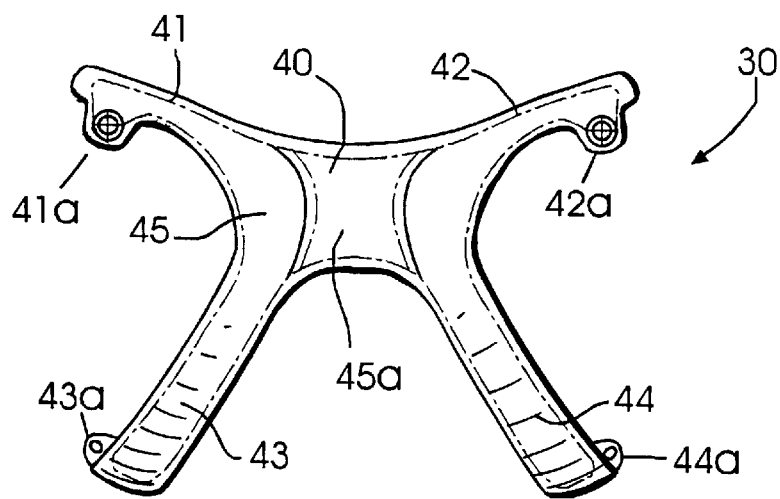
FIG. 5
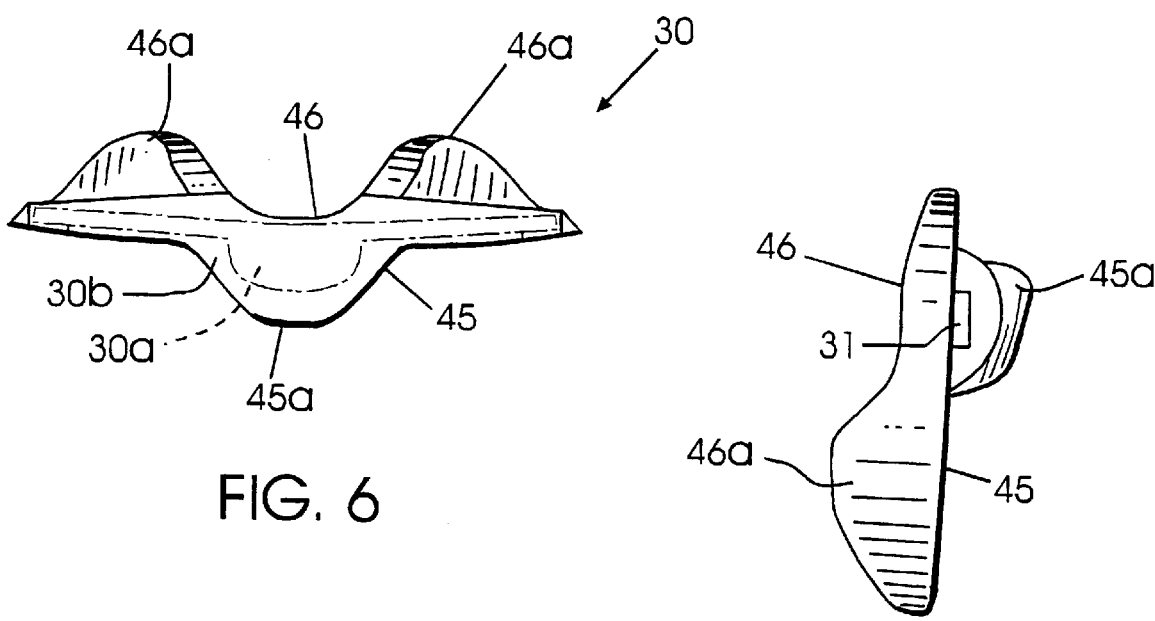
FIG. 6
FIG. 7

EYEWEAR FRAME CONSTRUCTION

BACKGROUND OF THE INVENTION

The present invention relates to eyewear frames, and more particularly relates to a novel front frame construction for eyewear.

Eyewear styles basically include a front frame for holding one or two lenses and a pair of temples pivotally connected to either side of the front frame. The front frame may comprise more than one component, for example, bridge, brow bar, nose pad and eyewire components which are fit together to form a single front frame unit. The individual frame components may be formed of any desired material or combinations thereof (e.g., metal and plastics). There are a variety of known techniques for securing various eyewear components together. For example, in a metal front frame, it is common to form a pair of eyewires which are each split and include a groove traversing the inside edge thereof To insert a lens, the eyewire is temporarily spread apart and the beveled lens edge is inserted into the inner eyewire groove. The free ends of the eyewire are then brought together and secured, usually with a screw and barrel element called a "rim lock" in the art. In this way, the eyewire secures the lens to the front frame. A bridge element extends between and joins the eyewire pair to form a full front frame.

Combining a metal front frame with additional frame elements (e.g., a bridge which extends between the right and left eye members) formed of a different material (e.g., plastic) may be aesthetically desirable, but difficult to manufacture due to a lack of mechanical affinity between the different materials which have different rates of thermal expansion, for example. Further, eyewear must be able to withstand a variety of stresses, both mechanical and environmental in nature. It is thus very important to secure the various components of an eyewear together in a precise and mechanically reliable manner. When using two or more different materials, the manner of attaching the components together becomes even more critical due to the factors enumerated above.

SUMMARY OF THE INVENTION

The present invention provides an apparatus and method for securing multiple front frame components of an eyewear together in an attractive and mechanically strong and reliable manner. The invention is particularly useful in front frame constructions having components formed of different materials.

More particularly, the front frame of the invention comprises right and left eye members defining right and left eye openings for insertion of a lens therein, respectively. In the preferred embodiment, the eye members are formed of metal. The front frame further comprises a unitary bridge component which is preferably made of a molded thermoplastic or rubber material. The bridge component is configured into a generally butterfly shape, having a central portion with four "arms" radially extending from the central portion. The front frame thus comprises five main components: two eye members; two lenses; and a bridge, which are formed of separate materials. The present invention provides an apparatus and method for attaching these separate components together to form a strong, mechanically reliable front frame unit which is furthermore very aesthetically pleasing.

The front frame is assembled into a single unit by placing the bridge component behind and against the rear surfaces of the right and left eye members. In this position, the bridge spans between the inner side extents of the right and left eye members which themselves are slightly spaced apart from each other. The four arms of the bridge component generally follow the curved contour of the respective eye members such that the arms of the bridge are substantially hidden from a person facing the front of the eyewear. The eye members are further each provided with a tabbed projection extending from the inner side extents thereof such that the tabbed projections extend toward each other in the assembled condition of the eyewear frame. The bridge component, which spans the eye members as stated above, is provided with an open channel which traverses the central portion of the bridge component. When attaching the bridge to the eye members, the tabbed projections on the eye members are inserted into opposite ends of the channel in the bridge, thus providing first and second attachment points between the eye members and the bridge component.

As mention above, the arms of the bridge component closely follow the contour of the eye members both along the upper and lower extents of the eye members. Each eye member includes at least one, but preferably two, lugs projecting radially inwardly from the upper and lower extents and adjacent the inner side extent, toward the eye opening thereof, respectively. The arms of the bridge component also include a like number of lugs projecting therefrom which are aligned with the lugs on the eye members.

To complete assembly of the front frame, the lenses are placed in a respective eye opening of the right and left eye members, from the front, with the peripheral edge of each lens abutting a flange of each eye member encircling the eye opening thereof. Securing means preferably in the form of screws are passed consecutively through each lens and into each pair of aligned lugs of the eye member and bridge component. As stated above, in the preferred form of the invention, a lug is located at each arm of the bridge component which would thus provide a total of four attachment points between the eye members, lenses and bridge component. These four attachment points, in combination with the two attachment points between the inner corners of the eye members and the central portion of the bridge component, provide a total of six attachment points for an extremely strong and mechanically reliable front frame unit.

BRIEF DESCRIPTION OF THE DRAWING

FIG. 5 is a front, elevational view of the bridge component of the front frame of the invention;

FIG. 6 is a top plan view thereof;

FIG. 7 is a side, elevational view thereof;

DETAILED DESCRIPTION

Figure 1:
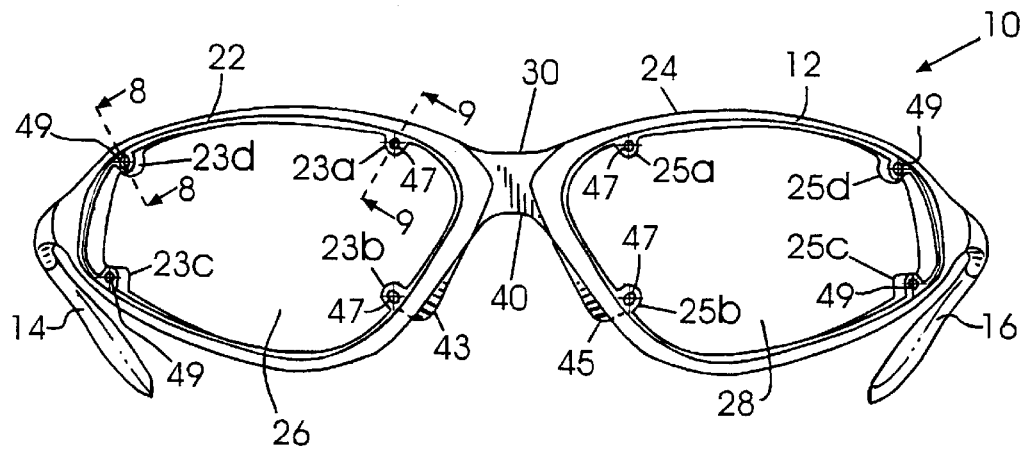
FIG. 1 is a front, elevational view of an eyewear construction in accordance with the present invention.

Referring to the drawing, there is seen in the Figures an eyewear 10 having a front frame 12 and a pair of temple members 14,16 pivotally connected to either lateral side of front frame 12 via hinge screws 18,20, respectively, although other hinge connections may be used if desired.

Front frame 12 includes five main, individual components which are secured together to form the front frame 12 in the manner to be described. These five main components include right and left eye members 22,24, right and left lenses 26,28, and a bridge component 30. Although the five main components may be made of any desired material or combinations thereof, in the preferred embodiment, the eye members 22,24 are made of metal (e.g., aluminum), the lenses 26,28 are made of glass or polycarbonate, and the bridge component 30 is made of a thermoplastic or rubber material.

Figure 2:
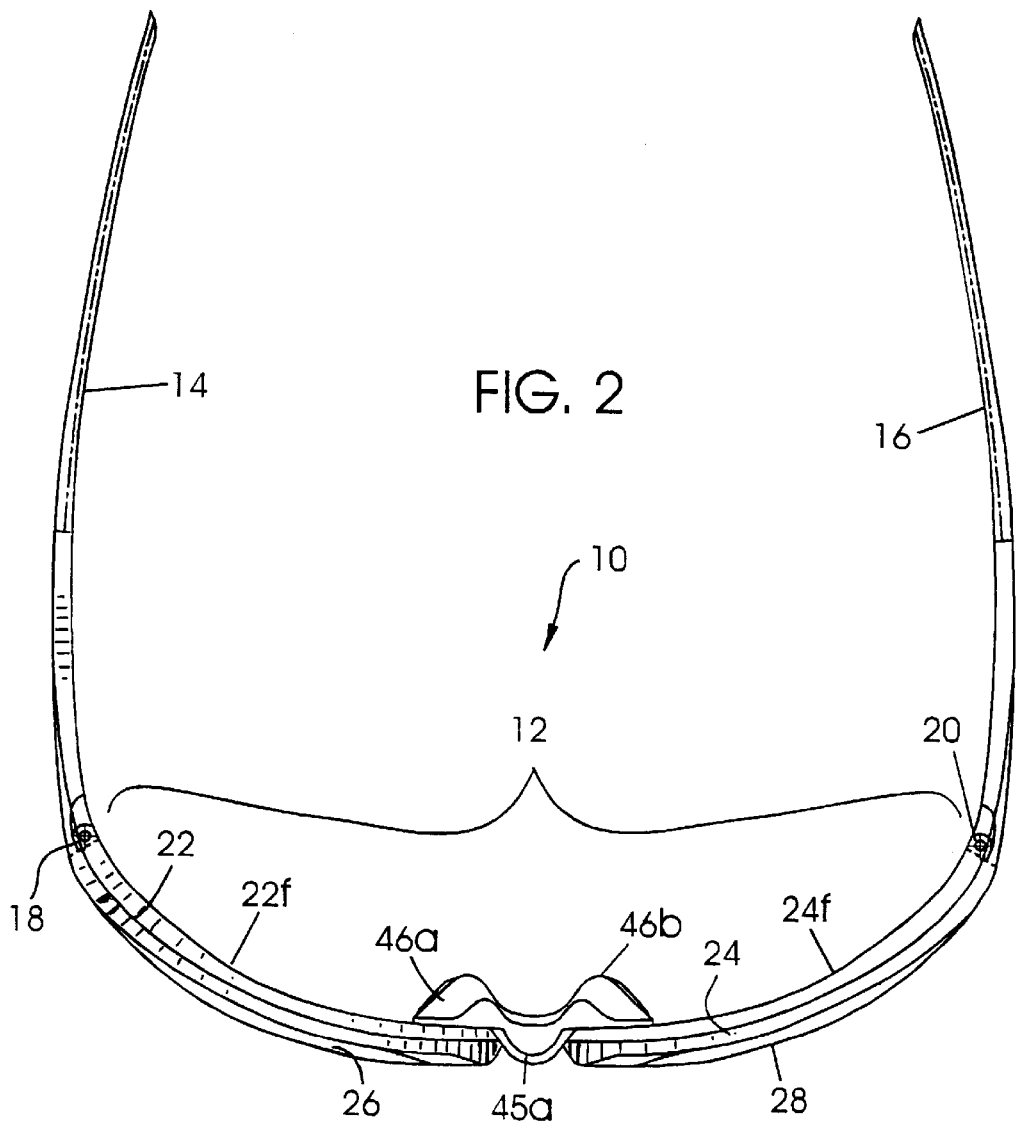
FIG. 2 is a top plan view thereof.
Figure 3:
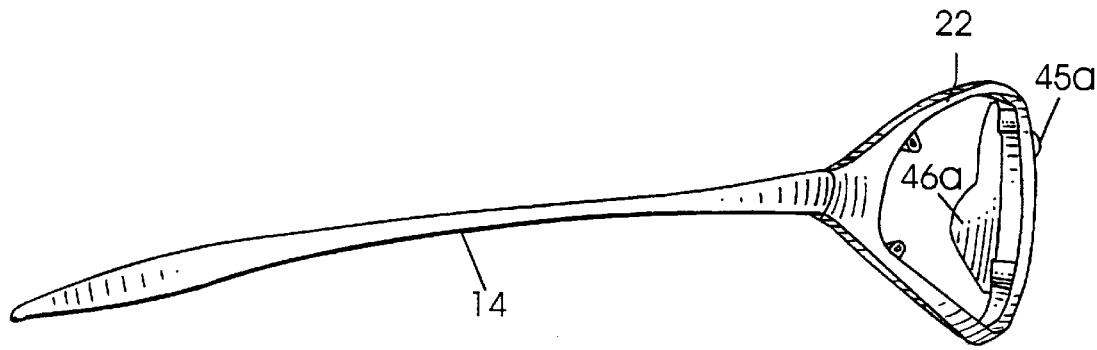
FIG. 3 is a side elevational view thereof.
Figure 4:
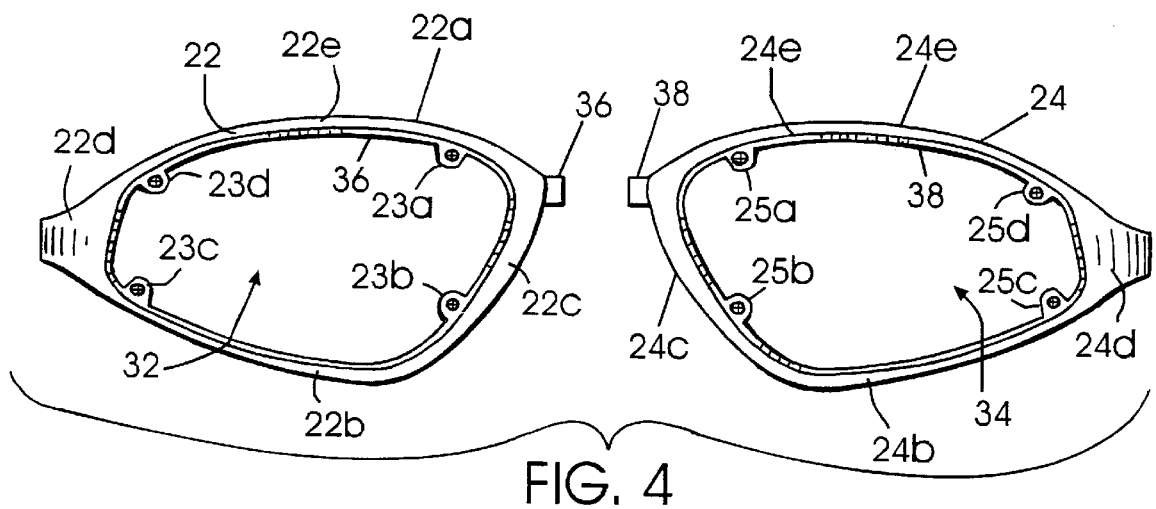
FIG. 4 is a front, elevational view of the individual, unassembled right and left eye members of the invention.
Figure 8:
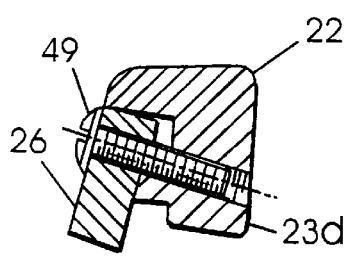
FIG. 8 is a cross-sectional view taken through the front frame along line 8—8 in FIG. 1.

As seen best in FIG. 4, eye members 22,24 each include an upper extent and lower extent 22a,24a and 22b,24b; opposite inner and outer side extents 22c,24c and 22d,24d; and opposite front and rear surfaces 22e,24e and 22f,24f (FIG. 2), respectively, all defining right and left eye openings 32,34, respectively. A flange 36,38 encircles the inner edge of each eye member 22,24, against which the peripheral edge of a respective lens 26,28 is placed, from the front, in the assembled condition of the front frame 12. Each eye member 22,24 further includes a tabbed projection 36,38 adjacent the juncture of the top and side extents 22a,22c and 24a,24c thereof, respectively, which projections are preferably integrally formed with a respective eye member. Each eye member 22,24 further includes a plurality of lugs 23a–d and 25a–d extending in spaced relation thereabout and toward the eye opening 32,34 thereof, respectively. The tabbed projections and lugs which are formed on the eye members serve as strategic attachment points during assembly of the eye members with the lenses and bridge component in the manner to be described.

Turning attention to FIGS. 5–7, bridge 30 is seen to be formed as a unitary piece, although it may include one or more overlays of materials of differing hardness values as described more fully below. Bridge 30 is configured with a central portion 40 and four arms 41–44 radially extending therefrom to form a general butterfly shape. As seen best in FIGS. 6 and 7, bridge component 30 has opposite front and rear surfaces 45 and 46, respectively, with the rear surface 46 thereof configured with a pair of nose rest portions 46a,46b and front surface 45 configured with a raised portion 45a. As seen best in FIG. 1, the arms 41–44 of bridge component 30 generally follow the contour of the upper and side extents 22a,22c and 24a,24c of the eye members 22,24, respectively.

Figure 9:
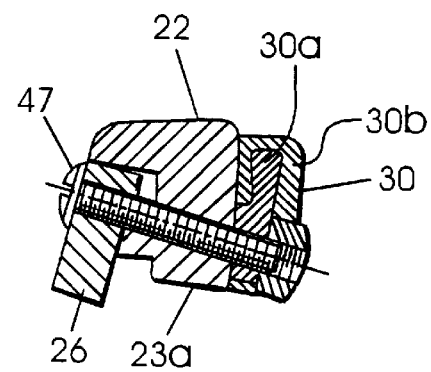
FIG. 9 is a cross-sectional view taken through the front frame along line 9—9 of FIG. 1.

As seen in the cross-sectional view of a portion of bridge component 30 seen in FIG. 9, in the preferred embodiment, bridge 30 is formed with materials having different hardness values, with the "core" 30a being of a relatively stiff material, and an outer "shell" 30b being of a softer material which will not cause irritation when placed against the skin. The hardness and types of material used for core 30a and shell 30b should be selected so as to provide only a small degree of flexing at the bridge area between the eye members 22,24.

The manner of attaching the five main components together will now be described. As seen in FIG. 7, bridge component 30 includes an open channel 31 extending laterally through the central portion 40 thereof To attach bridge component 30 to eye members 22,24, the tabbed projections 36,38 of each eye member 22,24 are first inserted into opposite sides of channel 31 of the bridge component 30. When the tabbed projections are fully inserted into channel 31, the front surface 45 of the bridge component arms 41–44 are pressed against the rear surfaces 22f,24f of eye members 22,24, with the central portion 40 of the bridge component spanning the space between the eye members 22,24 as seen best in FIG. 1. It will also be noticed that the arms 41–44 of the bridge component substantially follow the contour of the top and side extents 22e,22c and 24e,24c of eye members 22,24, respectively, such that the arms 41–44 are mostly hidden from view when viewing the eyewear 10 from the front.

As seen in FIG. 5, bridge component 30 is provided with a total of four lugs 41a–44a at the terminal end of each arm 41–44 thereof, respectively. When the bridge component 30 is attached to the eye members 22,24 as described above, these lugs 41a–44a align with the lugs 23a,23b and 25a,25b on eye members 22,24, respectively. With the pair of lenses 26,28 inserted into eye openings 22,24, securing members, preferably in the form of screws 47, are passed consecutively through the lenses and into each of the four pair of aligned lugs on the eye members 22,24 and bridge component 30, respectively (see also FIG. 9). With the tabbed projections 36,38 inserted into the channel 31 of the bridge component establishing first and second attachment points between the bridge and eye members, the four pairs of lugs and screws establish four additional attachment points between the lenses, eye members and bridge component, thereby providing a total of six attachment points for a very secure front frame unit. Also, as seen in FIG. 1, four additional screws 49 are passed through lenses 26,28 and into outer lugs 23c,d and 25c,d, respectively, to secure the lenses to the outer extents 22d,24d of eye members 22,24, respectively.

It will thus be appreciated that the present invention provides an apparatus and method for attaching multiple eyewear components made of different materials together to form a single front frame unit which is mechanically reliable and secure, and also very aesthetically pleasing and economical to manufacture.

What is claimed is:

1. In an eyewear frame, a method for attaching a bridge component, right and left eye members, and right and left lenses together into a single front frame unit, said method comprising the steps of:

a) providing said bridge compnent with four arms radially extending from a central portion of said bridge component;

b) providing each of said eye members with at least one lug, said eye members each defining a right and left eye opening with said lug extending toward a respective said eye opening, each of said eye members further including a flange encircling the eye opening thereof;

c) inserting said right and left lenses into said right and left eye openings with the peripheral edge of said lenses abutting said flange of a respective said eye member; and d) securing said bridge component, said eye members and said lenses together by placing said bridge component between and against said eye members with said arms of said bridge component following the contour of said eye members, and passing a securing member consecutively through each said lens, said lug, and said bridge component.

2. The method of claim 1, and further comprising the steps of:

a) providing a lug at the end of each of said arms of said bridge component;

b) providing each said eye member with two lugs which each individually align with a lug of said bridge component upon attaching said bridge component and said eye members together; and c) passing a said securing member consecutively through each said lens and aligned pairs of lugs on said bridge component and said eye members.

3. The method of claim 1, and further comprising the steps of:
  a) providing each said eye member with a tabbed projection;
  b) providing said bridge component with a channel traversing said central portion thereof; and
  c) inserting said tabbed projections into opposite ends of said channel of said bridge component such that said tabbed projections extend toward one another in said central portion of said bridge component.

4. The method of claim 3, and further comprising the steps of:
  a) providing a lug at the end of each of said arms of said bridge component;
  b) providing each said eye member with two lugs which each individually align with a lug of said bridge component upon attaching said bridge component and said eye members together; and
  c) passing a screw consecutively through each said lens and aligned pairs of lugs on said bridge component and said eye members.

5. The method of claim 1 wherein said eye members and said bridge component are formed of different materials.

6. The method of claim 5 wherein said eye members are formed of metal and said bridge component is formed from a thermoplastic material.

7. The method of claim 5 wherein said eye members are formed of metal and said bridge component is formed of a rubber material.

8. The method of claim I wherein said securing member is a screw.

9. An eyewear frame construction comprising:
  a) a bridge component having opposite front and rear surfaces and a central portion and four arms radially extending from said central portion, at least two of said arms including a lug thereon;
  b) right and left eye members defining right and left eye openings, respectively, said eye members each having top, bottom and opposite inner and outer side extents and front and rear surfaces, each of said eye members further including at least one lug extending toward said eye opening thereof;
  c) right and left lenses each having a peripheral edge, said right and left lenses being inserted into said right and left eye openings, respectively; and
  d) means for attaching said lenses, said eye members and said bridge component together into a single unit, said means comprising the steps of:
    i) placing said front surface of said bridge component against said rear surface of said right and left eye members, with said central portion of said bridge component extending between the juncture of said top and inner side extents of said eye members, respectively, and said lugs on said arms being aligned with a lug on a respective said eye member; and
    ii) passing a securing member consecutively through each said lens and aligned pair of lugs on said eye members and said bridge component.

10. The eyewear frame construction of claim 9, and further comprising an open channel extending laterally through said central portion of said bridge component, and a tabbed projection extending from each of said eye members adjacent the juncture of said top and inner side extents thereof, respectively, said tabbed projections extending into opposite ends of said channel such that said tabbed projections extend toward each other within said central portion of said bridge component.

11. The eyewear frame construction of claim 10, and further comprising a lug adjacent the terminal end of each of said arms of said bridge component, and at least two lugs on each said eye member such that each said lug on said bridge component aligns with a lug on a respective said eye member, and a securing member extends through each pair of aligned lugs consecutively through said lens, said eye member and said bridge component.

12. The eyewear construction of claim 11 wherein said arms of said bridge component follow the contour of said top and inner side extents of each said eye member, respectively, with said central portion of said bridge component extending between said eye members.

13. The eyewear construction of claim 9 wherein said eye members are made of metal and said bridge component is made of a plastic material.

14. The eyewear construction of claim 9 wherein said eye members are made of a metal and said bridge component is made of a rubber material.

15. The eyewear construction of claim 9 wherein said securing member is a screw.

* * * * *